April 2, 1957  A. ANTHONY  2,787,218
AIRCRAFT

Filed Feb. 25, 1953  3 Sheets-Sheet 1

By D. E. Snyder
Attorney

April 2, 1957
A. ANTHONY
2,787,218
AIRCRAFT
Filed Feb. 25, 1953
3 Sheets-Sheet 2
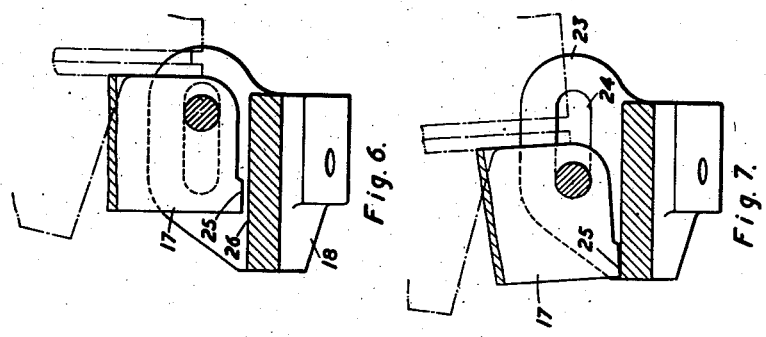
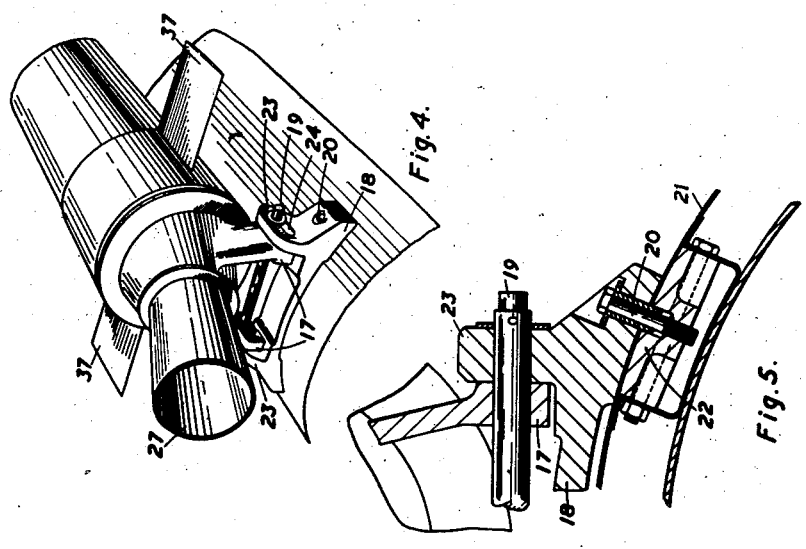
Inventor
By D. E. Snyder
Attorney

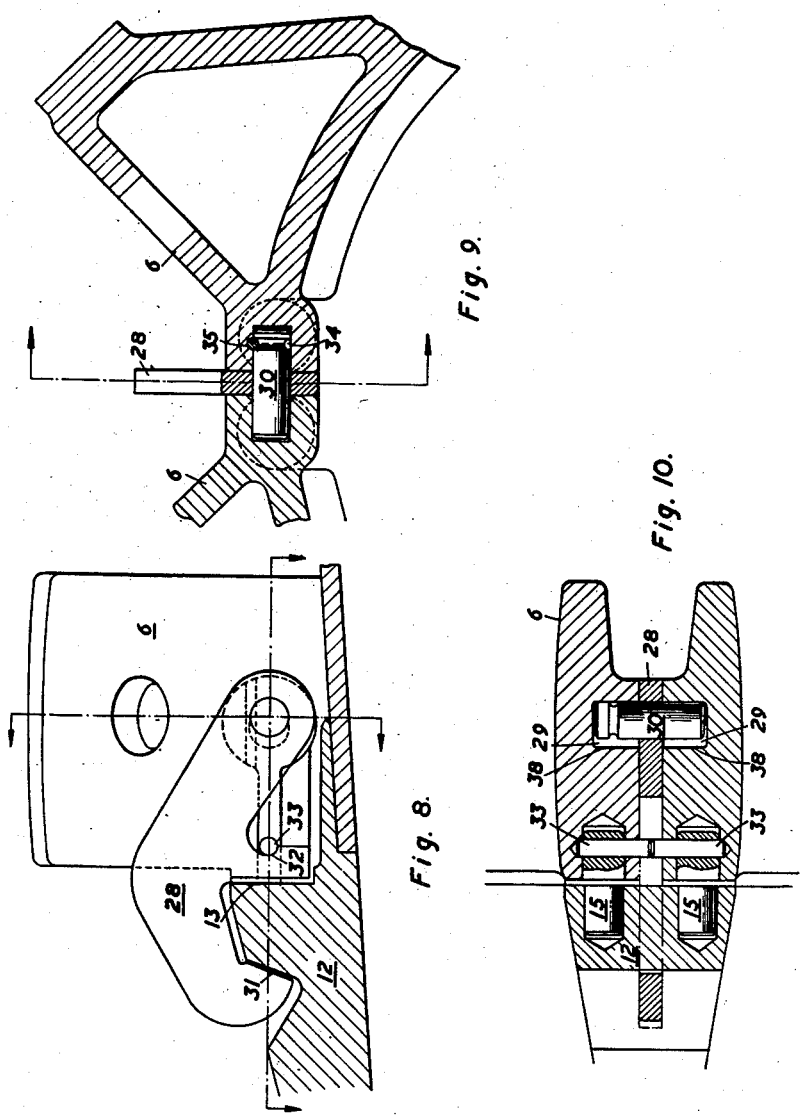

United States Patent Office 2,787,218
Patented Apr. 2, 1957

2,787,218

AIRCRAFT

Alastair Anthony, Farnham, England, assignor to the Minister of Supply in Her Majesty's Government of the United Kingdom of Great Britain and Northern Ireland, London, England Application February 25, 1953, Serial No. 338,741

Claims priority, application Great Britain February 25, 1952

10 Claims. (Cl. 102—49)

This invention relates to aircraft having propulsion boosting means, for example starter rockets, which are jettisoned in flight. Although not inherently of limited application the invention has originated in connection with the launching of pilotless aircraft.

In order to ensure aerodynamic stability of the aircraft both before and after the boost means are jettisoned while at the same time to some extent minimising the areas of stabilising surfaces and their encumbent weight and drag penalties, it is convenient to employ a wrap round arrangement of the boost means, that is one in which a plurality of booster elements are disposed around the body of the aircraft. This arrangement has the further advantage over alternatives, such as arranging a boost element in tandem with the aircraft, that the overall dimensions of the combination of aircraft and boost means, are not substantially greater than those of the aircraft alone whereby ground handling and launching are facilitated. The "wrap-round" boost arrangements presents difficulties, however, in jettisoning the several boost elements without damaging the aircraft and while maintaining a desired flight path, and an object of the invention is to provide for such jettisoning.

In particular the invention is concerned with the system of jettisoning "wrap-round" boost elements by "petalling." In this system each boost element, comprising for example one or more rockets, is attached to the aircraft at longitudinally spaced points and the forward attachments of the several elements are released first, allowing the several elements to pivot about their rear attachments before the latter are fully disengaged. Thus the boost elements, at the instant when they become independent of the aircraft, are directed outwardly therefrom and so tend to disperse without subsequently colliding with the aircraft. A further object of the invention is to provide means for ensuring the jettisoning of "wrap-round" boost elements in the above manner, the means being such that the aircraft after dispersion of the boost system is largely free from the encumbrance or external excrescence of structure associated with their attachment and at the same time not involving unduly complex mechanism.

According to the invention the forward attachment of a plurality of jettisonable boost elements disposed round the body of an aircraft comprises in the case of each boost element a forward mounting pedestal integral therewith which pedestal is adapted for abutment in the axial direction (i. e. longitudinally of the aircraft) with a forward stop attached to the aircraft body, the pedestal mounting having complementary spigot and recess formations engaged by axial sliding between them which locate and oppose displacement of the boost element in directions laterally of the aircraft. The spigot and recess formations of each element have, preferably, a similar axial engagement so as to be disengaged by a similar rearward movement of each element relatively to the aircraft body. The rearward attachment of the boost elements comprises, in the case of each element, a hinge mounting having a hinge pin extending transversely to the aircraft, of which hinge mounting one half is positively secured to the element and the other half is breakably secured (e. g. by necked bolts arranged to fracture under given excess loads) to the aircraft body. The holes for the hinge pin are elongated in at least one half of the hinge mounting so as to allow the half secured to the boost element to slide therewith rearwardly of the aircraft a limited distance to disengage the forward attachment. A limit stop is provided associated with the hinge mounting to limit its angular travel to a similar predetermined amount in the case of each boost element. The hinge mounting and associated limit stop are made substantially stronger than the breakable attachment to the aircraft body. Adjacent boost elements are provided, at a region spaced forwardly from their rear attachments and preferably adjacent their forward attachments, with spigot and recess formations engaged in the direction peripherally of the aircraft body which relate the rearward movements of adjacent boost elements until their forward attachments are disengaged. Thereafter, while the peripherally engaged spigot and recess formations are free to disengage upon angular movement of the adjacent boost elements about their rear hinge mountings, they serve to synchronise such angular movement in its initial stages.

In order that the various aspects of the invention may be fully understood, constructional embodiments of two possible forms will be described with respect to the accompanying drawings, in which:

Figure 4 is an isometric view of the rear attachment of the boost rockets of Figure 1;

Figure 5 is a fragmentary cross-section in a transverse plane through the aircraft of a detail of the rear attachment of Figure 4;

Figures 6 and 7 are fragmentary cross-sections in a plane longitudinally of the aircraft of the rear attachment of Figure 4 respectively before and during its disengagement;

Figures 8, 9 and 10 are respectively fragmentary part sectioned side elevation, front elevation and plan of a modified forward attachment embodying the second form of the invention.

Figure 1:
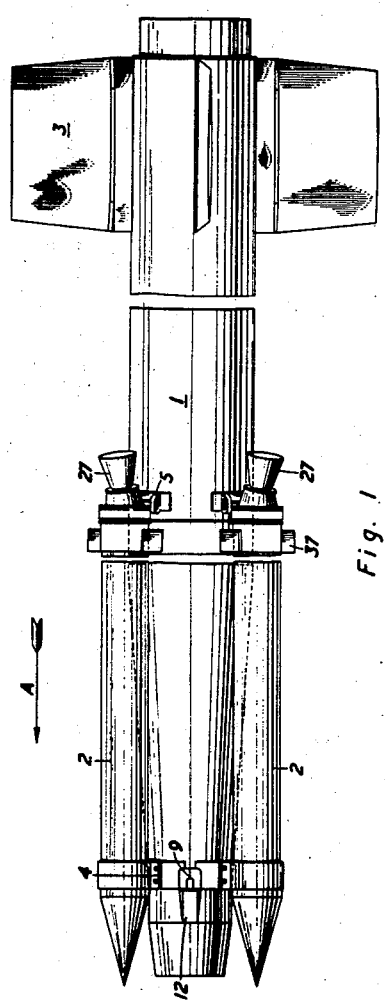
Figure 1 is a side elevation of a combination of aircraft and boost rockets embodying the first form of the invention.
Figure 3:
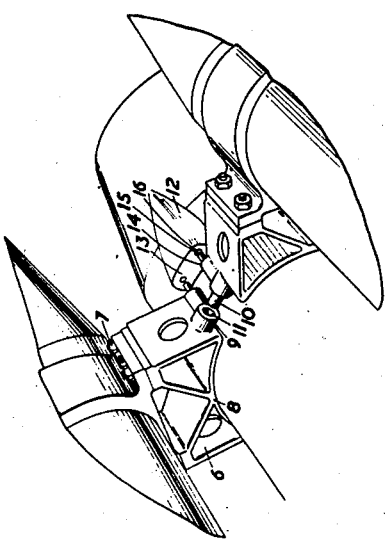
Figure 3 is an isometric view of the forward attachment of the boost rockets of Figure 1 just after release.
Figure 2:
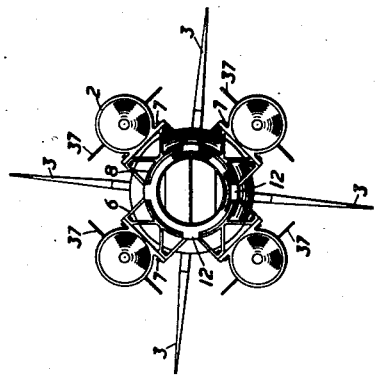
Figure 2 is a front elevation corresponding to the side elevation of Figure 1.

In the embodiment of the first form of the invention shown in Figures 1 to 7, the aircraft body 1 (adapted for flight in the direction of arrow A, Figure 1) is provided with four boost rockets 2 disposed symmetrically round it with their longitudinal axis substantially parallel to that of the aircraft. Each rocket lies in a longitudinal plane intermediate between those containing the stabilising surfaces 3 of the aircraft to avoid damage thereto either by the efflux from the rockets or by the rockets themselves during separation. Each rocket has a front and rear attachment, 4 and 5 respectively, to the aircraft body. The front attachment 4 comprises in each case a mounting pedestal 6 positively attached to the rocket by bolts 7, which pedestals each have segmental base 8 which abuts with the corresponding bases of adjacent pedestals to form a ring round the aircraft body. The abutting surfaces 9 lie in radial planes and are provided, in each adjacent pair of pedestals, with a dowel 10 rigidly fixed in one pedestal and extending normally to the abutting surfaces, i. e. in the plane of and tangential to the ring of which the pedestals form part, a complementary socket 11 being provided in the other pedestal into which the dowel 10 is a sliding fit. The aircraft body 1 is provided with four forward stops 12 each having a rear thrust face 13 in a common plane transverse to the body of the aircraft and a complementary forward thrust face 14 is provided on either end of each segmental pedestal, the forward thrust faces on the adjacent end of two pedestals both co-operating with one forward stop. These thrust faces are provided with sliding complementary dowels 15 and sockets 16 extending in a direction longitudinally of the aircraft, the dowels being secured in this case to the pedestals and each pedestal having two dowels, one for each forward thrust face 14 and each forward stop having correspondingly two sockets 16. Thus the separation of the ring of segmental bases 8 is prevented while the axially extending dowels 15 engage the sockets 16 but will occur quite readily when the axial dowels 15 are disengaged, as is apparent from Figure 3.

The rear attachment 5, see Figures 4 to 7, comprises in each case a pair of feet 17 attached to the rocket, which feet are pivotably attached to a trunnion saddle 18 by a hinge pin 19. The trunnion saddle 18 is seated on the aircraft body and is attached thereto by bolts 20; each bolt 20 (see particularly Figure 5) passes through the surface 21 of the aircraft body into a pad 22 within the body and is of limited strength so as to fracture in a manner to be described without causing damage to the adjoining structure. While the feet 17 are provided with circular holes for the hinge pin 19, the complementary trunnions 23 are provided with holes 24 elongated in the direction longitudinally of the aircraft. The arrangement is such that these elongated holes 24 permit sufficient rearward movement of the hinge pin 19 to disengage the axial dowels 15 of the forward attachment and afford a rear stop for the pin 19.

As so far described the operation of the device is as follows. While the boost rockets 2 are operating to deliver, in combination, an effective forward thrust on the aircraft they are all constrained against their forward stops 12. When the thrust of the rockets is exceeded by their combined drag they slide rearwardly without freedom of movement otherwise.

When a limited amount of rearward movement has occured the dowels 15 of the forward attachments become disengaged (the rearward movement being then arrested). Each boost rocket is then constrained under drag loads to pivot away from the aircraft about its respective hinge pin 19. The peripherally engaged dowels 10 and sockets 11 on adjacent boost rockets, as well as synchronising their rearward movement, serve also to synchronise their pivoting movement in the initial stages, the dowels being progressively disengaged as the pivoting movement proceeds. It will be appreciated that, although once the dowels 10 are fully disengaged the subsequent movements of the rockets will proceed quite independently they will nevertheless be in substantial synchronism.

The rear feet 17 of each rocket have toes 25 (see particularly Figure 6) which are initially clear of the outer surface 26 of the trunnion saddle 18. During the subsequent pivoting movement of the feet 17 about the axis of the hinge pin 19, the toes 25 approach and finally contact the surface 26 of the trunnion saddle thereby obstructing further pivoting motion (see particularly Figure 7). It will, however, be apparent that the angular momentum of the rocket together with the moment exerted by the aerodynamic forces thereon have considerable tendency to maintain the pivoting movement. Consequently loads are transmitted though the trunnion saddle 18 which tend to impose an irresistable tension on the bolts 20 which accordingly fracture when the limit of their strength is reached. Consequently all the boost rockets and their attachments, with the exception only of the forward stops 12 and the pads 22 with the ends of the bolts 20 are released from the aircraft. No subsequent drag at all is imposed by the pads and bolts, of course, as they are contained inside the aircraft body, while the forward stops need not be such as to incur high drag penalties.

As may best be seen in Figure 4, each boost rocket 2 is provided at its rear end with vanes 37. These vanes are arranged to have a small positive angle of incidence when the rocket is in the normal pre-release position of Figure 1. Once the pivoting movement has occurred and the rear attachment is fractured, the vanes tend to lift the rear end of the rocket immediately away from the aircraft thus wholly or partly arresting rotation of the rocket consequent upon its pivoting movement and so lessening the risk of impingment of its efflux (if any remains) upon the body of the aircraft.

As is shown in Figure 1, in the pre-release position the outlet venturi 27 of each boost/rocket is directed slightly outwardly to avoid damage to the aircraft by its efflux, so that when the rocket is effective there is an inward thrust component on the trunnion saddle 18, while the forward thrust component is taken wholly by the forward stops 12. In these circumstances, since the inward thrust component acts to counterbalance the outward lift component of the vanes 37, the loading on the bolts 20 is quite small or negligible. On the other hand, the impact loading on the bolts during release, as previously mentioned, is of a very high order. Consequently considerable latitude is permissible in the actual breaking load of the bolts without detriment to the effective operation of the release mechanism. Furthermore, the mechanism is otherwise entirely dependent for its operation on the sliding between low friction surfaces under the direct influence of high drag loads. It will be appreciated therefore, that the mechanism is inherently reliable in operation.

In contrast to the above form of the invention where release of the boost elements occurs only when, as a combination, they cease to deliver effective thrust, a second form of the invention provides for release only when the effective thrust of each individual element has ceased.

In the embodiment of the second form of the invention now described the arrangement of aircraft, boost rockets, rear attachments, forward stops, and axial dowels is generally similar to that described above. Otherwise, as shown in Figures 8 to 10, the arrangement is as follows. The forward mounting pedestals 6 of each adjacent pair of boost rockets have their adjacent ends in abutment with an intermediate hook 28 and the abutting surfaces of each member are provided with sockets 29 in which is seated a common dowel 30 to which the hook 28 is attached. The sockets 29 are elongated in the direction longitudinally of the aircraft, the arrangement being such that each pedestal is able to move rearwardly from the forward stop 12 a short distance before contacting the dowel 30. The hook 28 extends forwardly beyond the thrust face 13 of the forward stop and engages an inclined face 31 formed thereon. A further extension on the hook 28 affords a reentrant notch 32 into which two release pins 33, attached one to each pedestal, enter in half-lapping engagement, so restraining the hook into engagement with the inclined face 31 on the forward stop. Thus, when one boost rocket, having ceased to deliver thrust to the aircraft, moves rearwardly under drag loading until the forward surface 38 of its pedestal socket 29 engages the dowel 30, one release pin 33 is simultaneously disengaged from the notch 32, but the hook is still restrained by the second pin 33. When the second rocket of the pair ceases to deliver thrust it moves back to contact the dowel 30 taking with it the second pin 33 and the hook is then no longer restrained toward the inclined face 31. In time, a situation is reached where two of the four hooks 28 between adjacent pairs of rockets are no longer restrained and the third and fourth hooks are each restrained only by one pin 33, i. e. only one rocket is delivering an effective thrust, but this is sufficient to prevent the release of the adjacent hooks and so to oppose further rearward movement on any of the rockets due to their interconnection through the dowels 30. Consequently, when the effective thrust of the fourth rocket ceases and it moves back, each of the hooks 28 is free to ride up the inclined face 31 of its associated forward stop by pivoting about the axis of its associated dowel 30, thereby permitting all the rockets to complete the rearward movement necessary to release the axial dowels 15 of their forward attachments. Each dowel 30 has at one end a circumferential groove 34 which is loosely engaged by a retaining pin 35, whereby the dowel 30 and attached hook 28, although free to rotate, are integrated and consequently carried clear of the aircraft with the associated rockets.

I claim:

1. An apparatus to jettison booster propulsion elements from an aircraft, comprising a stop member with a rear thrust face secured to the aircraft body, an attachment member for connecting the forward end of a booster element to the stop member and permitting slidable disconnection of the stop member and the attachment member, an anchoring member disposed rearwardly of the thrust member, a frangible bolt securing the anchoring member to the aircraft body, a second attachment member at the rear portion of the booster element, and a hinge pin for connecting, with lost motion, the second attachment member to the anchoring member.

2. An apparatus as claimed in claim 1, in which the second attachment member has a foot to engage the anchoring member as a fulcrum when the booster element turns about the hinge pin.

3. An apparatus to jettison booster propulsion elements from an aircraft, comprising a stop member secured to the aircraft body and having a rear thrust face with a socket therein, an attachment member secured to a booster element, a dowel on said attachment member for engaging the socket in the stop member, an anchoring member disposed rearwardly of the stop member, a frangible bolt securing the anchoring member to the aircraft body, a second attachment member at the rear portion of the booster element, and a hinge pin for connecting, with lost motion, the second attachment member to the anchoring member.

4. An apparatus to jettison booster propulsion elements from an aircraft, comprising a stop member secured to the aircraft body and having a rear thrust face with a socket therein, an attachment member secured to a booster element, a dowel on said attachment member for engaging the socket in the stop member, a trunnion saddle with elongated slots therein arranged rearwardly of the stop member, frangible bolts securing the trunnion saddle to the aircraft body, a second attachment member secured to the rear part of the aircraft body, and a hinge pin carried by said second attachment member and engaging the elongated slots in the trunnion saddle.

5. An apparatus to jettison booster propulsion elements from an aircraft, comprising a stop member secured to the aircraft body and having a rear thrust face, an attachment member secured to a booster element, a pivotal hook carried by the attachment member to engage the stop member, a trunnion saddle with elongated slots therein arranged rearwardly of the stop member, frangible bolts securing the trunnion saddle to the aircraft body, a second attachment member secured to the rear part of the aircraft body, and a hinge pin carried by said second attachment member and engaging the elongated slots in the trunnion saddle.

6. An apparatus to jettison booster propulsion elements from an aircraft, comprising stop members secured to the aircraft body, attachment members secured to the forward ends of booster elements arranged around the aircraft body, readily disengageable members for connecting adjacent attachment members, means for connecting the attachment members to the rear faces of the stop members but permitting slidable disconnection therefrom, anchoring members disposed rearwardly of the stop members, frangible bolts securing the anchoring members to the aircraft body, attachment members at the rear parts of the booster elements, and hinge pins connecting, with lost motion, the attachments at the rear parts of the booster elements to the anchoring members.

7. An apparatus as claimed in claim 6, having feet on the attachments at the rear parts of the booster elements, which feet can engage the anchoring members to serve as fulcrums.

8. An apparatus to jettison booster propulsion elements from an aircraft, comprising stop members secured to the aircraft body, attachment members secured to the forward ends of booster elements arranged around the aircraft body, first dowel and socket connections between adjacent attachment members, second dowel and socket connections for connecting the attachment members to the rear faces of the stop members, anchoring members disposed rearwardly of the stop members, frangible bolts securing the anchoring members to the aircraft body, attachment members at the rear parts of the booster elements, and hinge pins for connecting, with lost motion, the attachments at the rear ends of the booster elements to the anchoring members.

9. An apparatus to jettison booster propulsion elements from an aircraft, comprising stop members secured to the aircraft body, attachment members secured to the forward ends of booster elements arranged around the aircraft body, dowel and socket connections for connecting adjacent attachment members, pivotal hooks carried by the attachment members to engage the stop members, anchoring members disposed rearwardly of the stop members, frangible bolts securing the anchoring members to the aircraft body, attachment members at the rear parts of the booster elements, and hinge pins connecting, with lost motion, the attachment members at the rear parts of the booster elements to the anchoring members.

10. An apparatus to jettison booster propulsion elements from an aircraft, comprising stop members secured to the aircraft body and provided at their front parts with upwardly and rearwardly inclined faces and at their rear with thrust faces and sockets, pedestals for supporting the forward ends of booster elements arranged around the aircraft body, curved bases on said pedestals to extend about the aircraft body, dowels on adjacent pedestals for engaging the sockets in each stop member, a transversely supported pin carried by each dowel, pins supported in elongated slots in adjacent pedestals, hooks pivotally mounted on the pedestal supported pins and provided each with a rearwardly directed reentrant notch to engage the pins supported by adjacent dowels and with an inclined face to engage the inclined front face of a stop member, dowel and socket connections between adjacent pedestals, anchoring members disposed rearwardly of the stop members, frangible bolts securing the anchoring member to an aircraft body, attachment members at the rear part of the booster elements, and hinge pins connecting, with lost motion, the attachment members at the rear parts of the booster elements to the anchoring members.

References Cited in the file of this patent

UNITED STATES PATENTS

| | | |
|---|---|---|
| 2,400,248 | Morgan | May 14, 1946 |
| 2,544,830 | Grill | Mar. 13, 1951 |

FOREIGN PATENTS

| | | |
|---|---|---|
| 861,605 | France | Nov. 4, 1940 |